Jan. 19, 1937.　　　　　G. C. COX　　　　　2,068,448
CONTINUOUS HIGH TEMPERATURE ELECTROTHERMAL PROCESS
Original Filed March 30, 1933　　3 Sheets-Sheet 1
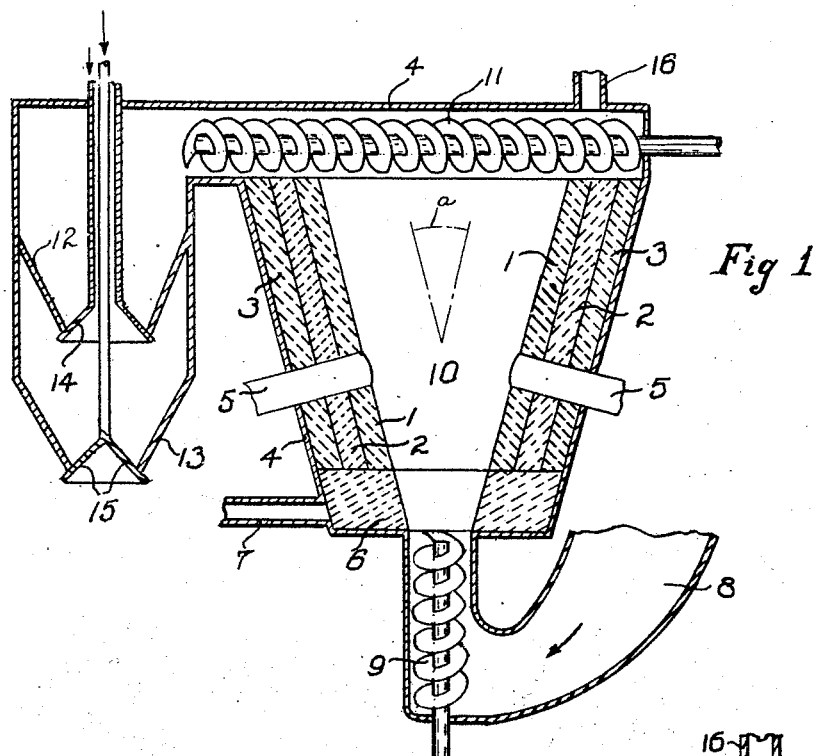
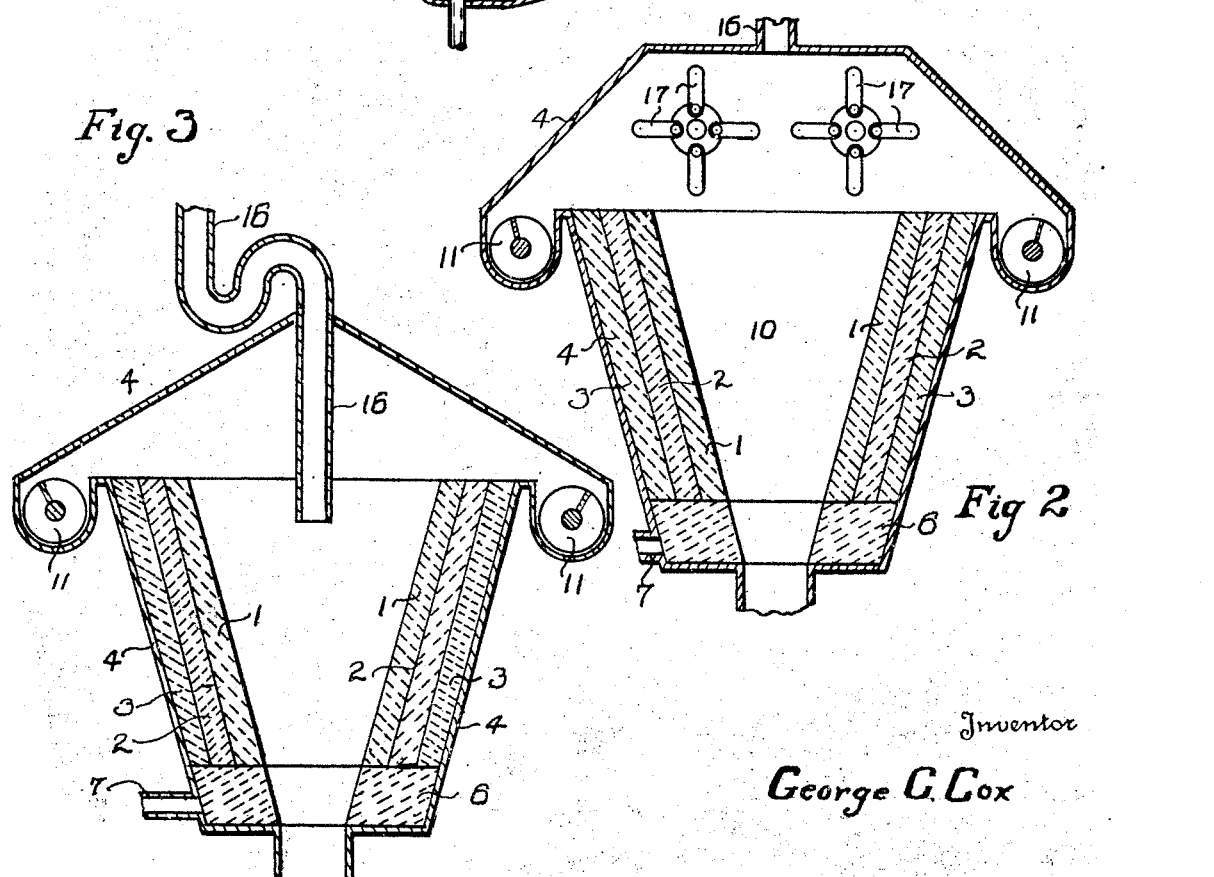
Inventor
George C. Cox
By Walter W. Burns
Attorney Jan. 19, 1937.  G. C. COX  2,068,448
CONTINUOUS HIGH TEMPERATURE ELECTROTHERMAL PROCESS
Original Filed March 30, 1933   3 Sheets-Sheet 3
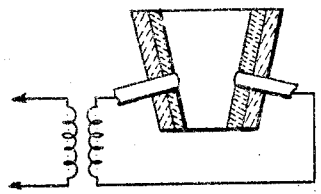
Fig. 6ª
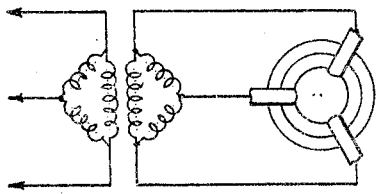
Fig. 6ᵇ
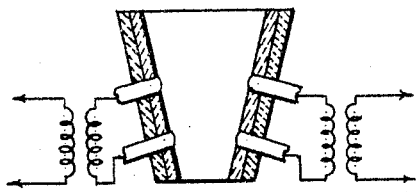
Fig. 6ᶜ
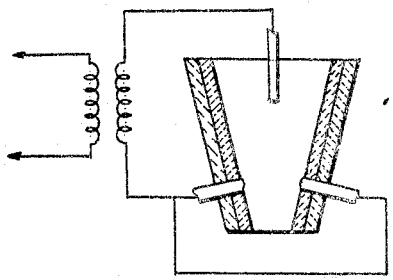
Fig. 6ᵈ
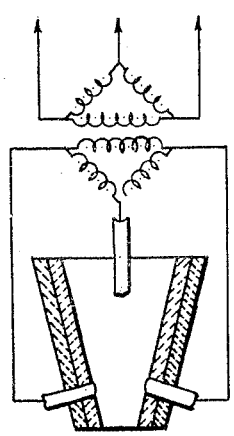
Fig. 6ᵉ
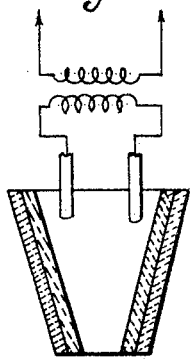
Fig. 6ᶠ
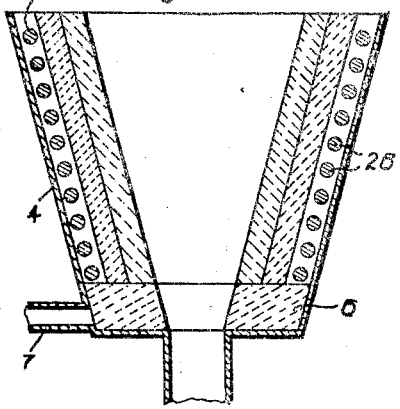
Fig. 6ᵍ
Inventor
George C. Cox
By Walter W. Burns
Attorney Patented Jan. 19, 1937

2,068,448

UNITED STATES PATENT OFFICE 2,068,448

CONTINUOUS HIGH TEMPERATURE ELECTROTHERMAL PROCESS

George Chandler Cox, Charleston, W. Va.

Original application March 30, 1933, Serial No. 663,603. Divided and this application November 14, 1936, Serial No. 110,931

7 Claims. (Cl. 13—34)

This invention relates to improvements in continuous high temperature electro-thermal processes involving physical reactions, chemical reactions or combinations of physical and chemical reactions.

An object of this invention is the provision of a continuous process for effecting high temperature physical reactions more efficiently and economically and under more uniform conditions than is known to the present art. Such reactions are: complete or fractional distillations or sublimations above or below atmospheric pressure; crystallizations; recrystallizations; and changes from an amorphous to a crystalline state or from a crystalline to an amorphous state.

Another object of this invention is the provision of a continuous process for effecting high temperature chemical reactions under more efficient economic and uniform conditions than is known to the present art. Such high temperature chemical reactions are: reactions between two or more solids; reactions between one or more solids and one or more liquids at the reacting temperature; reactions between one or more solids and one or more gases at the reacting temperature; reactions between one or more solids, liquids or gases; and high temperature catalytic reactions.

A further object of this invention is the provision of a continuous process for effecting a high temperature chemical reaction as set forth, the product or products of which are subjected to a physical reaction as set forth, all within one reacting chamber.

A further object of this invention is the provision of a continuous process for reacting a solid, liquid or gas which is corrosive to a refractory lining or metal casing at the reacting elevated temperature without damage to such lining or casing.

By a continuous process is meant one in which there is no cooling down or stopping of the operation, the electric energy being continuously supplied. In general, the charged materials are continuously supplied and the products are continuously discharged, although the charging and discharging may be intermittent.

Fig. 1 is a vertical cross section of one type of furnace having the screw conveyor for carrying off the reacted material.

Fig. 2 is a view similar to Figure 1 showing a different means of removing the reacted material, the heating means being omitted.

Fig. 3 is a vertical section illustrating one method of introducing liquids into the furnace.

Figs. 6a, 6b, 6c, 6d, 6e, 6f, are views illustrating various positions of the electrodes and various wiring diagrams.

Fig. 6g is a view illustrating a wiring for induction heating.

In the drawings similar numbers refer to similar parts.

Figure 4:
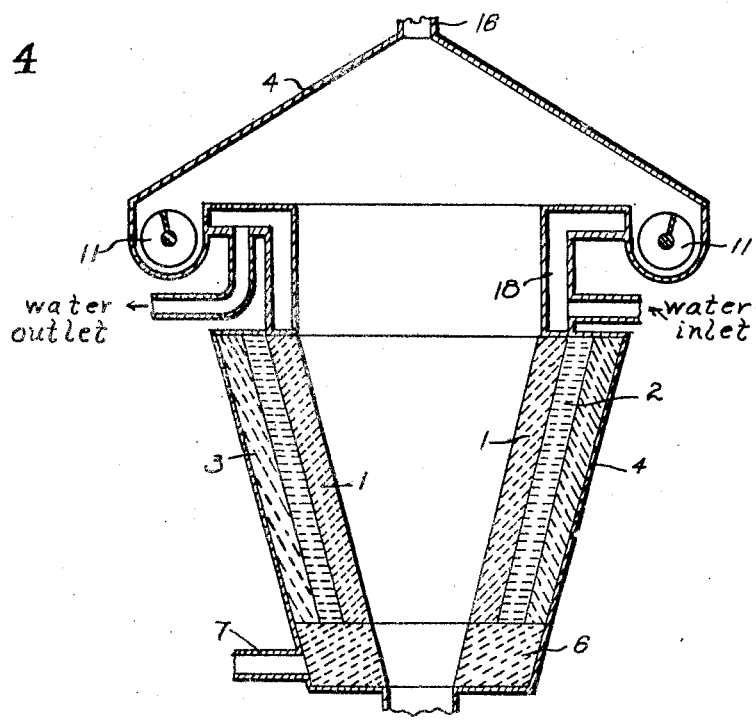
Fig. 4 illustrates one way of cooling the upper portions of the reacted material by liquid as water.

Fig. 1 shows a vertical section of one form of device in which the high temperature continuous processes are conducted. The horizontal cross-section may be circular or rectangular as desired. In this section 1 represents a highly refractory lining, which may be made from the charge itself, backed up by other refractory and thermal insulating materials 2 and 3. These refractories are contained within the gas tight casing 4. The bottom of the casing 4 contains a porous refractory 6 through which the discharge gases or liquids pass to the exhaust pipe 7. Hopper 8 contains the solid or solids to be charged into the furnace by means of the screw charging device 9, or other customary charging device, such as a piston type charging ram.

A charging device is required which will produce a high pressure capable of forcing the charge upward into the center of the controlled temperature reaction zone 10. Heat energy may be supplied through electrodes 5 which may be two or more in number according to whether single or polyphase electric energy is used. The arrangement for supplying electrical energy to the reaction zone 10 may also be accomplished by any of the well-known methods, such as direct or indirect resistance, direct or indirect arc, or induction heating, or by combinations of more than one of these methods. The charging device 9 must also be capable of forcing the solid reaction products upward to the screw conveyor 11 by continually forcing the fresh charge into the reacting zone 10. The solid reaction products are moved by screw conveyor 11 into bell hopper 12. Any suitable form of mechanical conveyor may be used instead of screw conveyor 11. The solid reaction products are finally discharged from bell hopper 12 through bell hopper 13 by means of the cone bell valves 14 and 15. In such reactions where it is desired to discharge the gaseous products of reaction in a countercurrent flow to the solid products of reaction, pipe 16 may be closed and the gases passed through porous filter 6 and discharged at 7. Where a concurrent flow of solid and gaseous product is desired, pipe 7 may be closed and the gases discharged through pipe 16. It is obvious that any liquid reaction products could be discharged at pipe 7. It is often desirable to make the refractory linings 1, 2 and 3 and filter 6 from the same material as the most refractory solid component of the charge.

It will be noted that the angle $a$ which the side walls make with each other will vary considerably. If the charge and solid products remain powdery or granular the angle $a$ may be made small. However, if the reacting zone tends to clog due to sintering, crystallization or packing, the angle $a$ must be increased until the upward force on the charge is sufficient to break the bridge of material away from the walls. The practical maximum limit of angle $a$ is obviously 180°.

Fig. 2 shows a vertical section of a discharge arrangement which may be used when the discharge material tends to be lumpy due to crystallization, recrystallization, sintering or partial fusion. Revolving hammers 17 may be used to pulverize the material so that the conveyors 11 will discharge the material into the bell hoppers.

Fig. 3 shows an arrangement in which it is desired to obtain a countercurrent reaction between one or more solids and a liquid which may be introduced through pipe 16. To prevent the escape of gases a trap may be used on pipe 16, as shown. The inner end of pipe 16 may be made to extend into the reaction zone by the use of a water cooled jacket.

Fig. 4 shows an arrangement in which it is desired to cool the solid reaction products before discharging them from the furnace atmosphere. The solid reaction products can be made to pass up through and over the water cooled jacket 18. The shape of the water cooled jacket 18 can be varied as desired.

Figure 5:
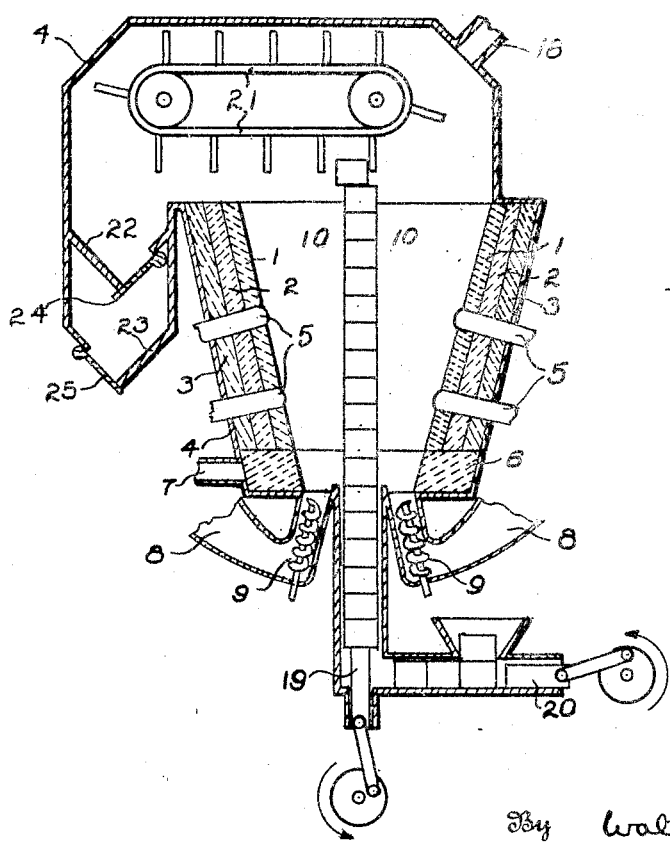
Fig. 5 is a structure intended for treating pressed forms such as brick.

Fig. 5 shows a schematic sectional view of a reaction chamber in which it is desired to treat pressed shapes such as brick, electrodes, or other similar shapes. The process for treating brick or other pressed shapes with the particular schematic arrangement shown is somewhat as follows: The brick are forced upward by plunger 19. When plunger 19 has reached the upper end of its stroke, plunger 20 forces a brick partway under the brick that plunger 19 has forced up. Plunger 19 can then be lowered to the bottom of its stroke so that plunger 20 can force the consecutive brick in alignment with the vertical column of brick. The operation is then repeated. In order to insure a uniform treatment, it is usually desirable to prevent the formation of vertical channels in the reaction zone. This vertical channeling may be prevented by introducing granular material of somewhat similar composition to the brick around the column of brick by means of the conventional screw charging device 9, or by means of plungers in place of the screw charging device.

The brick or electrodes may be removed from the discharge end of the reaction chamber by means of a chain drag 21 and be discharged from the gate hopper 22 through gate hopper 23 by means of the gates 24 and 25. The gases of reaction may be discharged through the filter 6 and pipe 7 or, if desired, from the pipe 16.

Long cylindrical electrodes or rods may be processed by modifying the charging and discharging mechanism to accommodate such shapes. In general, it is desirable that such cylinders have their axes perpendicular.

Various means of supplying electrical energy to the reaction zone are schematically shown in Fig. 6a to Fig. 6g. Single phase two-electrode resistance or arc heating is indicated in Fig. 6a in which the electrodes are in a horizontal plane. Polyphase multiple electrode resistance or arc heating is indicated in Fig. 6b in which the electrodes are in a horizontal plane. Single or polyphase heating is indicated in Fig. 6c in which the coacting electrodes are in a vertical plane. Axial flow of single phase heating current is indicated in Fig. 6d. Both axial and lateral heating currents are indicated in Fig. 6e supplied by polyphase current connections. Top electrode heating is indicated in Fig. 6f. Induction heating is indicated in Fig. 6g in which an induction coil 26 may be contained within the metallic case 4. For induction heating, the case must be made non-inductive and must not form a closed circuit around its circumference. It is understood that resistance, arc or induction heating or combinations of two or more means with single or multiple electrodes may be used within the spirit of the appended claims.

Various examples will now be given in order to illustrate the various objects as defined:

(1) For the distillation of coal, the coal is forced upward by the device 9 into the electrically heated reaction zone. Coke is removed by the top discharge device and the distilled gases are preferably removed through pipe 7, but may be removed through pipe 16.

(2) For the calcination of carbon, a similar process is carried out and the volatilized gases are preferably removed through pipe 7. In general, it is desirable to scrub the volatilized gases to remove all heavy hydrocarbons and to recirculate a part of such gases in a countercurrent direction to the carbon. The scrubbed gases would then be pumped into the reaction chamber through pipe 16, and all gases would be removed through pipe 7.

(3) In a continuous process for the manufacture of graphite, the coke or coal would be forced upward by the mechanical device 9 and the gases of reaction and the sublimed products of reaction should be removed through the pipe 7. By removing the gases in this manner, slight contamination of the graphite will result. The graphite is removed through the bell hoppers. In a continuous graphite process, it would be desirable to have the graphite pass upward through and then over a water cooling jacket 18, as shown in Fig. 4. By such method the graphite would be cooled below its oxidation temperature before being discharged to the atmosphere. In a continuous process for the manufacture of graphite electrodes or other pressed forms, the raw electrodes would be forced upward through the center of the reaction zone; and raw granular or pulverized electrode material would be forced upward around the electrodes as shown in Fig. 5, so that no channeling or unequal heating would result.

(4) An illustration of the continuous reaction of two or more solids charged into the furnace would be the continuous process for producing silicon carbide, and the method would be practically the same as that used for the production of graphite. In a continuous process for the production of silicon carbide rods or brick by recrystalization, the method used would be practically the same as that for the manufacture of graphite electrodes.

(5) An illustration of the continuous reaction of one or more solids with one or more liquids would be the continuous production of carbon disulphide. In such a process the carbon would be fed in by the charging device 9, and liquid sulphur would be fed into the reaction zone in a countercurrent direction to that of the carbon by introducing it through the pipe 16 of Fig. 3. The vapors of reaction would generally be discharged from the pipe 7. When it is desirable to introduce the sulphur in the solid state with the carbon, the vapors of reaction would not be withdrawn through the pipe 7 but through the pipe 16.

(6) An illustration of the continuous reaction of one or more solid compounds with one or more gases would be the continuous chlorination of ores, such as gold or copper ores. In such cases the ores are fed into the reaction chamber by the mechanical feeder 9, Fig. 1 and chlorine is fed into the chamber through pipe 16. The metallic chlorides are removed through pipe 7 and the spent ore is discharged from the top through the bell hopper discharge device.

A similar process would be required in the manufacture of ferric chloride in which iron oxide ore and carbon may be fed into the reaction zone in such proportions that the iron ore is ordinarily reduced to sponge iron, which is then converted to anhydrous ferric chloride by chlorine gas fed into the reaction zone through pipe 16. The anhydrous chloride would be removed through pipe 7.

It is observed that one of the chief advantages of carrying out high temperature reactions by the methods described when compared to the present art is that the outside casing may be a metallic gas tight casing remaining at or near atmospheric temperature. When a metallic casing is at an approximate atmospheric temperature, it is practically inert to gases such as chlorine, sulphur vapor and the like. Such vapors are highly corrosive to construction metals at elevated temperatures.

Another distinct advantage in comparison to the present art is that an upward pressure feed of the solid materials insures a uniform feeding of fresh charge into the reaction zone, a uniform passage of material through the reaction zone and a uniform discharge of material from the reaction zone. The inherent difficulties of non-uniform feed and channeling observed in a "down feed" are not obtained in the process described. Where the charge acts as a resistance for the electric current, the heating is much more uniform in an "up feed" than in a "down feed" furnace, because the mechanical pressures exerted upon a given cross-section are more nearly equalized when a charge is fed upward.

Another distinct advantage of this "up feed" process, in comparison to "down feed" processes, is that the charge itself will fall outward toward the metal shell and can, therefore in many cases, be used as its own refractory and thermal insulation. With the "down feed" principle the charge falls in toward the center and the charge cannot be made to conveniently act as its own refractory.

Another distinct advantage of this "up feed" reaction chamber is that bridging and clogging can be eliminated. In a "down feed" furnace bridging and clogging is often a serious difficulty.

It is understood that the particular forms of apparatus shown and described, and the particular procedure set forth are presented for purposes of explanation and illustration, and that various modifications of said apparatus and procedure can be made without departing from the invention as defined in the appended claims.

This application for a division of co-pending application Number 663,603 filed March 30, 1933.

Having described my invention, what I claim is:—

1. An improved method of conducting high temperature reactions upon solids including loose material, which comprises forcing a charge of unreacted material into a charging zone at the bottom of a treating chamber and then upwardly into an electrically heated zone, treating the charge in the heated zone and forcing the reacted material upwardly past, out of the heated zone and through a cooling zone far enough to have the reacted material form a thermal insulation above the heated zone, and causing the horizontal cross sectional area of the mass of solid material to increase as it progresses through said zones.

2. An improved method of conducting high temperature reactions upon solids including loose material, which comprises forcing a charge of unreacted material into a charging zone at the bottom of a treating chamber and then forcing it upwardly into an electrically heated zone, treating the charge in the heated zone and forcing the reacted material upwardly past, out of the heated zone and through progressively decreasing temperature zones, the reacted material forming a thermal insulation for the material in the heated zone until it is removed, and causing the horizontal cross sectional area of the mass of solid material to increase as it progresses through said zones.

3. An improved method of conducting high temperature reactions upon liquid and solid material, the latter including loose material, which comprises forcing the unreacted liquid material into contact with the solid material and forcing the unreacted solid material into a charging zone at the bottom of a treating chamber and then upwardly into an electrically heated zone, treating the charge in the heated zone, and forcing the reacted material upwardly past and out of the heated zone and through a cooling zone far enough to have the reacted material form a thermal insulation above the heated zone, and causing the horizontal cross sectional area of the mass of solid maerial to increase as it progresses through said zones.

4. An improved method of conducting high temperature reactions upon gaseous and solid material, the latter including loose maetrial, which comprises forcing the unreacted gaseous material into contact with the solid material and forcing the unreacted solid material into a charging zone at the bottom of a treating chamber and then upwardly into an electrically heated zone, treating the charge in the heated zone and forcing the reacted material upwardly past and out of the heated zone and through a cooling zone far enough to have the reacted material form a thermal insulation above the heated zone, and causing the horizontal cross sectional area of the mass of solid material to increase as it progresses through said zones.

5. An improved method of conducting high temperature reactions upon gaseous and solid material, the latter including loose material, which comprises forcing the unreacted gaseous material into contact with the solid material and forcing the unreacted solid material into a charging zone at the bottom of a treating chamber and then upwardly into an electrically heated zone, treating the charge in the heated zone and forcing the reacted material upwardly past and out of the heated zone and through progressively decreasing temperature zones, the reacted material forming a thermal insulation for the material in the heated zone until it is removed and causing the horizontal cross sectional area of the mass of solid material to increase as it progresses through said zones.

6. An improved method of conducting high temperature reactions upon gaseous, liquid and solid material, the latter including loose material, which comprises forcing the unreacted gaseous and liquid material into contact with the solid material and forcing the unreacted solid material into a charging zone at the bottom of a treating chamber and then upwardly into an electrically heated zone, treating the charge in the heated zone and forcing the reacted material upwardly past and out of the heated zone and through a cooling zone far enough to have the reacted material form a thermal insulation above the heated zone, and causing the horizontal cross sectional area of the mass of solid material to increase as it progresses through said zones.

7. An improved method of conducting high temperature reactions upon solids including loose material which comprises forcing a charge of unreacted material into a charging-zone at the bottom of a treating chamber and then upwardly into an electrically heated zone, utilizing a portion of the solid material as a refractory wall during passage through the heated zone, treating the charge in the heated zone and forcing the reacted material upwardly past, out of the heated zone and through a cooling zone, far enough to have the reacted material form a thermal insulation above the heated zone, and causing the horizontal cross sectional area of the mass of solid material to increase as it progresses through said zones.

GEORGE CHANDLER COX.